United States Patent

[11] 3,617,257

| [72] | Inventor | Jean Rouanet |
| | | Metz, France |
| [21] | Appl. No. | 712,005 |
| [22] | Filed | Mar. 11, 1968 |
| [45] | Patented | Nov. 2, 1971 |
| [73] | Assignee | Institut DeRecherches De LaSiderurgie |
| | | Francaise |
| | | Saint Germain-en-Laye (Yvelines), France |
| [32] | Priority | Mar. 13, 1967 |
| [33] | | France |
| [31] | | 98,464 |

[54] PROCESS FOR CONTINUOUSLY REFINING METAL
4 Claims, 3 Drawing Figs.

[52] U.S. Cl..................................................... 75/46,
75/52, 75/60, 266/34
[51] Int. Cl. ...................................................C21b 13/14,
C21c 5/36
[50] Field of Search........................................... 75/46, 45,
43, 60, 61, 51, 52

[56] References Cited
UNITED STATES PATENTS
2,526,474  10/1950  Lewis ............................  75/43

| 788,650 | 5/1905 | Knoth............................ | 75/46 |
| 3,356,490 | 12/1967 | Muller et al. ................. | 75/60 |
| 3,486,882 | 12/1969 | Raguin et al.................. | 75/60 X |

FOREIGN PATENTS

| 1,407,082 | 6/1965 | France ......................... | 75/60 |
| 1,407,082 | 3/1966 | France ......................... | 75/60 |
| 1,407,082 | 3/1966 | France ......................... | 75/60 |
| 1,418,924 | 10/1965 | France ......................... | 75/60 |

Primary Examiner—L. Dewayne Rutledge
Assistant Examiner—G. K. White
Attorney—Michael S. Striker ABSTRACT: A process for continuously refining metal in at least two stages in which partly refined metal and slag formed in a first refining vessel is passed into a first decanting vessel adjacent thereto in which the slag is separated from the partly refined metal and the latter fed into a second refining vessel and the further refined metal and slag produced therein is fed into a second decanting vessel from which the metal is discharged while the slag is passed back into the first decanting vessel to react with the partly refined metal and slag therein, and an apparatus for performing the above process.

PATENTED NOV 2 1971 3,617,257

Inventor:
Jean Rouanet
By Michael S. Striker
+ Horney

PROCESS FOR CONTINUOUSLY REFINING METAL

BACKGROUND OF THE INVENTION

The present invention relates to a process for continuously refining metal, especially for continuously refining cast iron into steel in which the refining process is carried out in at least two refining stages in two refining vessels which are respectively followed by decantating vessels in which the slag formed during the refining process in the two refining vessels is decanted from the refined metal.

It is well known that when a refining process of the aforementioned kind is carried out in two successive refining stages, the chemical composition of the slag formed at the first refining stage may differ essentially from the chemical composition of the slag formed at the second refining stage. The slag formed in the second refining stage contains a nonnegligible amount of iron in the form of an iron oxide. This iron oxide, when, as usually, discharged with the slag formed in the second refining stage, represents an important metal loss and therefore it has already been suggested to recycle the slag in order to extract the iron therefrom.

To recuperate the metal contained in the slag emanating from the second refining vessel it has already been suggested to recirculate this slag into one of the refining vessels upstream of the last decanting vessel in order to subject this slag to a cycle of complete refining. However, the introduction of the slag into the turbulent contents of a refining vessel created considerable technical difficulties. In addition, the reaction between the slag and the metal in the refining vessel into which the slag has been recycled did not proceed as easily as could be expected since the volume of the metal in the refining vessel is relatively small.

It is an object of the present invention to provide for a process and apparatus to recuperate the iron contained in the slag formed in a second refining vessel while avoiding the technical difficulties and other disadvantages of such processes and apparatus known in the prior art.

SUMMARY OF THE INVENTION

In a continuous metal-refining process including at least two refining stages, the steps of treating the metal to be refined in a first refining vessel to form partly refined metal and slag, feeding the partly refined metal and slag into a first decanting vessel, discharging the slag from the first decanting vessel and feeding the partly refined metal into a second refining vessel, treating the partly refined metal in the second refining vessel to form further refined metal and additional slag, feeding the further refined metal and the additional slag into a second decanting vessel, discharging the further refined metal from the second decanting vessel and feeding the additional slag back into the first decanting vessel to react with the partly refined metal and the first-mentioned slag therein.

The steps of treating the metal in the first refining vessel and of treating the partly refined metal in the second refining vessel preferably comprise blowing of the refining agents, preferably including an oxidizing gas and slag-forming material, into the metal, respectively the partly refined metal, to form a metal-slag foam therefrom which overflows into the decanting vessel adjacent to the respective refining vessel.

The process of the present invention includes also the steps of introducing at a first level into the inlet opening of a treatment vessel a substance to be treated, subjecting the substance in the vessel to a treatment so as to transform at least part of the substance into a foam rising in the treatment vessel to at least a second level higher than the first level, transferring from the second higher level the foam by gravity into the inlet opening of an additional treatment vessel located at a level lower than the second level and having an outlet located at a level between the first and the second higher level, and subjecting the foam in the additional vessel to a foam-reducing treatment to obtain a material substantially free of foam, which is transferred at least in part by gravity from the outlet opening to the inlet opening of the first-mentioned vessel for further treatment therein.

On the other hand, the present invention includes also an apparatus for continuously refining metal and including at least two successive refining vessels, at least two decanting vessels respectively arranged downstream of the refining vessels for decanting slag and refined metal produced in the refining vessel from each other, passage means connecting the refining and decanting vessels with each other so that refined metal and slag produced in each of the refining vessels may flow into the decanting vessel downstream thereof and so that the refined metal received by the decanting vessel may flow into the following refining vessel, and a channel connecting the decanting vessel downstream of the last refining vessel with a decanting vessel upstream thereof for recirculating slag from the decanting vessel downstream of the last refining vessel into a decanting vessel upstream thereof.

The aforementioned apparatus of the present invention may also include one or more of the following characteristics in combination with the characteristics mentioned above:

1. a wall of the last decanting vessel may be adjacent to a wall of the decanting vessel into which the slag from the last decanting vessel is recirculated; or
2. the last decanting vessel and the decanting vessel into which the slag from the last decanting vessel is reintroduced may be separated by a common wall;
3. the aforementioned channel may communicate with the two mentioned decanting vessels through openings in the adjacent walls; or
4. if the two decanting vessels are separated by a common wall from each other, the channel may be formed by an opening in this common wall; and
5. the aforementioned channel may extend downwardly inclined from the last decanting vessel to the decanting vessel into which the slag from the last decanting vessel is reintroduced.

It has been ascertained that, during refining of cast iron in successive stages, the slag received in the last decanting vessel contains a considerable amount of iron, which may reach 30 percent of the weight of the slag.

Experiments carried out according to the method of the present invention have shown that it is possible to recuperate an essential portion of this iron if the slag separated from the metal in the last decanting vessel is recirculated, not into the preceding refining vessel, but into a recanting vessel upstream of the last decanting vessel. This surprising result is explained by the fact that the higher oxidized slag obtained from the second refining vessel is introduced into the decanting vessel upstream of the second refining vessel which contains a slag less oxidized and a considerable volume of partly refined metal which is reduced by the recirculated slag. Besides the fact that the recuperation of the iron contained in the slag emanating from the second refining vessel is more effective in a method carried out according to the present invention, the aforementioned manner of recycling the slag simplifies also considerably the technical problem connected with methods known in the art, since according to the process of the present invention the slag is reintroduced into a calm mass of material.

In addition, the recycling of the slag according to the process of the present invention produces also a number of further advantageous results, especially during the refining of phosphorous cast iron into steel.

In fact, the highly oxidized slag emanating from the last decanting vessel will react with the still carbonized metal in the upstream decanting vessel into which the aforementioned slag is reintroduced to produce a complimentary dephosphorization in the upstream decanting vessel without notable decarbonization of the metal therein by oxidizing the phosphor still contained in the metal by the recirculated slag, whereby the phosphor, oxidized in preference to the carbon, passes into the slag in the form of $P_2O_5$.

The aforementioned recycling of the slag emanating from the last decanting vessel is preferably carried out in a refining apparatus in which in each of the refining vessels a metal-slag foam is formed which rises above the level at which the material is introduced into the respective refining vessel so that it is possible to maintain the level of the slag in the last decanting vessel higher than the slag level in the decanting vessel upstream thereof so that the slag may be recirculated from the last decanting vessel into a decanting vessel upstream thereof by gravity.

The communication between the two decanting vessels may thus advantageously be formed by a channel which is inclined in downward direction toward the upstream decanting vessel. This channel is preferably held very short to avoid thermal losses therein and this channel may be reduced to a simple opening in a common wall between the two decanting vessels.

It is preferred in order to increase the contact of the recirculated slag with the metal and the primary slag fed into the upstream decanting vessel to introduce the secondary slag at a place into the upstream decanting vessel which favors the intermixing of the two slags and preferably the secondary slag is introduced into the upstream decanting vessel at a point distant from the discharge opening at which slag is discharged from the upstream decanting vessel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
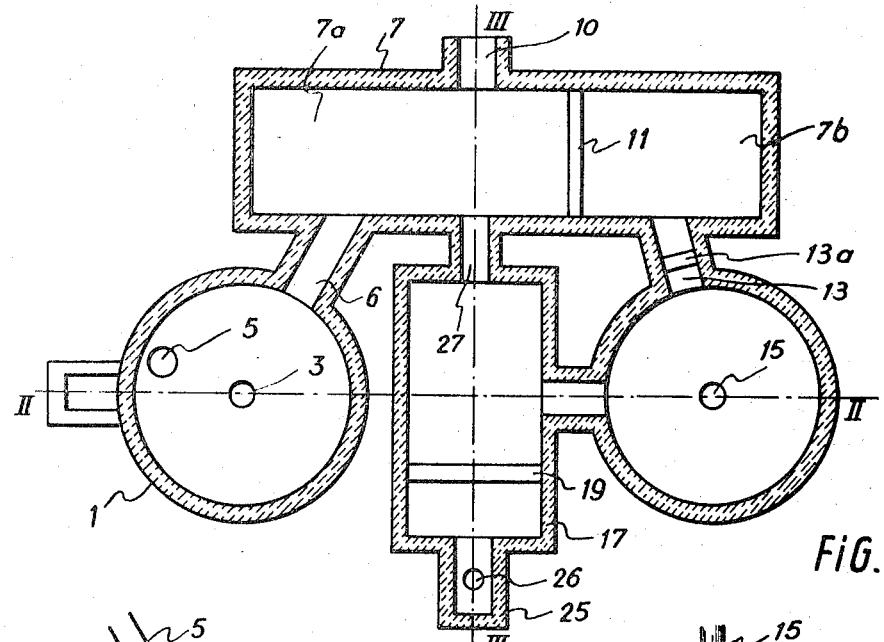
FIG. 1 is a sectional plan view of the apparatus according to the present invention.

Referring now to the drawings, it will be seen that the apparatus of the present invention may include a first refining vessel 1, which may continuously be supplied through a channel 2 with molten phosphorus cast iron, fed into the bottom region of the first refining vessel 1. The upright vessel 1 may have, as shown in FIG. 1, a substantially cylindrical cross section. A lance 3, extending through a central portion of the top wall of the refining vessel 1, serves to blow refining agents in form of a jet oxygen, which may contain particulated lime in suspension, onto the metal in the refining vessel 1 to thus partly refine the metal therein and to form a metal-slag foam rising to a level higher than that of the molten metal introduced into the bottom region of the refining vessel 1 through the inlet channel 2. The gas produced during this refining process is evacuated in upward direction through a conduit 5 extending upwardly from the top wall of the vessel 1. The metal-slag 4 is evacuated through a passage 6 into a decanting vessel 7 arranged laterally and between the first refining vessel 1 and a second refining vessel 14 spaced from the first refining vessel. In the first decanting vessel 7, also called the upstream decanting vessel, the slag metal foam fed thereinto through the passage 6 is allowed to settle and the less dense slag 8 will float on the metal 9 and is evacuated through the slag discharge opening or spout 10 from the first decanting vessel. The separation of the slag 8 from the metal 9 in the decanting vessel 7 is facilitated by means of wall 11. The wall 11 extends transversely through the decanting vessel 7 spaced from the bottom wall thereof and its top edge is located above the level of the material fed into the vessel 7. The wall 11 divides the decanting vessel 7 into two compartments 7a and 7b. Only the liquid metal will pass beneath the transverse wall 11 into the compartment 7b and pass from there through a passage 13 into the second refining vessel 14. In the second refining vessel the metal is further refined by means of oxygen and powdered lime blown onto the metal through the lance 15, whereby a metal-slag foam 16 is formed which is evacuated into the second decanting vessel 17 through the passage 18. A wall 19 extends transversely through the second decanting vessel 17 upwardly spaced from the bottom wall thereof to thus form an opening 20 between the bottom edge of the wall 19 and the bottom wall 23 of the second decanting vessel 17, whereas the top edge of the wall 19 extends upwardly beyond the level of the material fed into the second decanting vessel. The slag 21 floating on the metal 22 is separated from the latter by the transverse wall 19 and only the metal 22 passes through the opening 20 to the left of the wall 19, as viewed in FIG. 3, to flow through an opening 24 into an evacuating vessel 25 provided in the bottom wall thereof with an outflow nozzle 26 through which the metal may flow into a continuous casting apparatus of known type, not shown in the drawing. The separation of the metal from the slag in the second decanting vessel is further facilitated by the inclination of its bottom wall 23 towards the opening 20.

Figure 3:
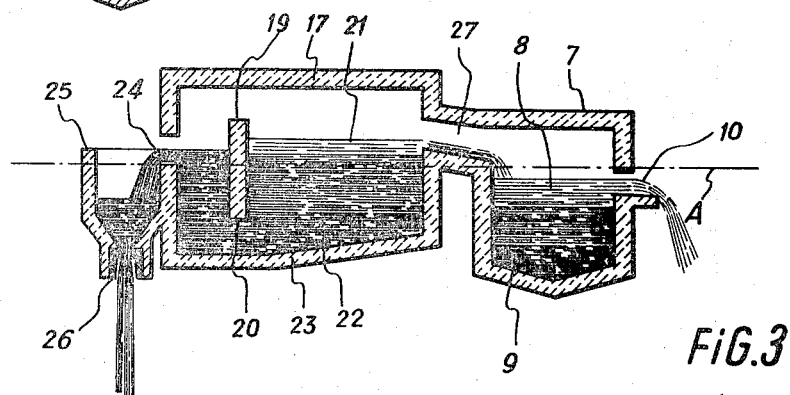
FIG. 3 is a section taken along the line III—III of FIG. 1.

The second decanting vessel 17 communicates with the upstream decanting vessel 7 through a channel 27 extending between one end wall of the second decanting vessel 17 and a wall of the first decanting vessel 7 adjacent thereto and being downwardly inclined toward the first decanting vessel 7, as best shown in FIG. 3. The slag 21 may therefore flow by gravity through the channel 27 from the second decanting vessel 17 into the first decanting vessel 7. There the slag 21 mixes with the slag 8 and reacts with the metal 9 fed from the first refining vessel 1 into the first decanting vessel 7 and is discharged from the latter together with the slag 8 through the spout 10. It will be noted that the spout 10 is provided in the wall of the first decanting vessel 7, which is opposite the wall at which the channel 27 communicates with the vessel 7.

It is understood that the two refining vessels as well as the two decanting vessels are lined with refractory material.

Figure 2:
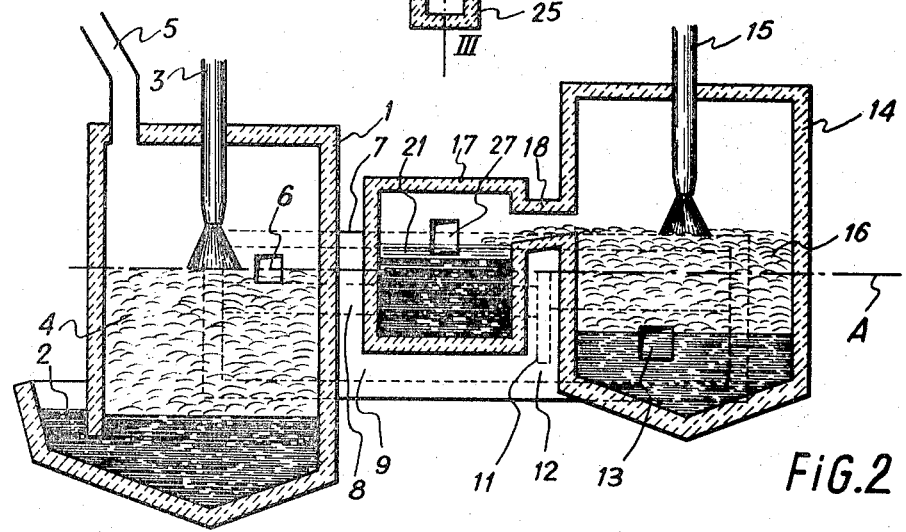
FIG. 2 is a section taken along the line II—II of FIG. 1.

As can be seen from FIG. 2, the metal to be refined is fed through the passage 2 into the first refining vessel 1 near the bottom region of the latter, whereas the metal-slag foam 4 produced in the refining vessel 1 is raised to a level A considerably above the level at which the metal is fed into the bottom region. The foam flows by gravity through the passage 6 into the first decanting vessel 7 and the metal layer 9 reaches in the compartment 7a a level which is about 15 cm. below the level indicated at A. In the compartment 7b the metal level is about 2 cm. higher than in the compartment 7a due to the hydrostatic pressure exercised by the slag 8. In the passage 13 the metal passes below a transverse wall 13a and upstream of the transverse wall 13a the level of the metal is about 2 cm. higher than downstream thereof so that upstream of the transverse wall 13a the metal level is about the same as in the compartment 7a, that is about 15 cm. below the level A. The metal flowing by gravity into the refining vessel 14 will attain in the latter due to the hydrostatic pressure exerted by the metal-slag foam a level about 5 cm. lower than that upstream of the transverse wall 13a. The metal slag foam 16 produced in the second refining vessel 14 reaches a height of about 40 cm. and the metal-slag foam is evacuated by gravity through the passage 18 into the second decanting vessel 17, and the highest portion of the passage 18 is about 35 cm. above the level of the metal in the second refining vessel, that is about 15 cm. above the level A. In the second decanting vessel 17 the level of the slag 21, which has a relatively small thickness in the neighborhood of 5 cm., is about 10 cm. above the level A. The slag 21 can therefore flow by gravity into the compartment 7a of the first decanting vessel 7 through the channel 27.

By way of example the following results as to iron output obtained in the same refining apparatus for a continuous refining process in two successive refining stages are given for the case in which the secondary slag is recycled as per the present invention and for the case in which such recycling of the secondary slag is not carried out.

In both cases a steel was produced having the following composition:

| | |
|---|---|
| C | = 0.04%; |
| P | = 0.02%; |
| Mn | = 0.2% and |
| the remainder | Fe; | from a phosphorus cast iron containing 3.8% C, 1.8% P. 0.6% Mn and 0.4% Si.

The portion of the iron loss which cannot be avoided was identical in both cases. This portion comprises essentially an iron loss due to incomplete decantation of the metal and to the losses due to formation of dust and salamander (mass of unfused metal).

The difference between the two losses resulted exclusively from the amount of iron oxide carried away in the slag. The weight of iron oxide present in the slag will depend on the weight of the slag formed and its content of iron.

In the present case in which it is desirable to produce a steel with a phosphor content of 0.02 percent, it is necessary to produce first a metal of an intermediate composition with a phosphorus content in the neighborhood of 0.15 percent and to obtain these values in primary slag is formed containing 8 percent of iron and a secondary slag containing about 30 percent of iron in the form of an oxide.

The amount of slag produced in the first decanting vessel was about 180 kg. per ton of cast iron introduced and about 70 kg. per ton of cast iron in the second decanting vessel when the operation was carried out without recycling of the secondary slag. In such an operation, a total of 250 kg. of slag per ton of cast iron introduced was discharged.

In the case in which the secondary slag (70 kg.) was recycled back into the first decanting vessel a total of 240 kg. slag per ton of cast iron was discharged from the latter. In fact, the mixing of the two slags takes place with a reduction of the weights since the secondary slag reacts in part with the primary slag and the metal contained in the first decanting vessel.

The loss of iron in form of oxide may therefore be summarized as follows:

When the refining takes place without recycling the secondary slag;
  loss of iron in the primary slag:
  $180 \times 8/100 = 14.4$ kg. per ton of cast iron;
  loss of iron in the secondary slag:
  $70 \times 30/100 = 21$ kg. per ton of cast iron,
  that is a total of 35.4 kg. per ton of cast iron.

When the refining takes place with recycling of the secondary slag
  loss of iron in the slag:
  $240 \times 8/100 = 19.2$ kg. per ton of cast iron; since the secondary slag reacts with the partially refined metal contained in the first decanting vessel until it is balanced with that of the primary slag containing 8 percent of iron.

Comparing the results obtained in the two cases, it will be evident that the recycling of the secondary slag permits to recuperate
  $35.4 - 19.2 = 16.2$ kg. per ton of cast iron, or
  $(16.2 \times 1000)/240 = 67.5$ kg. of iron per ton of slag.

With the novel process according to the present invention the iron output is therefore increased by 1.6 percent as compared with a method in which the secondary slag is not recycled.

Considering that the process is a continuous metal-refining process in which very great amounts of metal are refined, this increase in output obtainable with the method of the present invention evidently constitutes a great progress in the art.

While the process has been described above as a refining process of cast iron taking place in two consecutive refining stages, it is to be understood that the process of the present invention may also be used when the refining operation takes place in more than two successive stages.

It will be understood that each of the elements described above, or two or more together, may also find a useful application in other types of metal-refinig processes differing from the types described above.

While the invention has been illustrated and described as embodied in a metal-refining process taking place in successive refining stages and in which the slag obtained in the last stage is recycled into a decanting vessel upstream of the last stage, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is set forth in the appended claims:

1. In a continuous metal-refining process including at least two refining stages, the steps of treating the metal to be refined in a first refining vessel to form partly refined metal and slag; feeding the partly refined metal and slag into a first decanting vessel; discharging the slag from the first decanting vessel and feeding the partly refined metal into said second refining vessel; treating the partly refined metal in a second refining vessel to form further refined metal and additional slag; feeding said further refined metal and said additional slag into a second decanting vessel; discharging said further refined metal from said second decanting vessel; and feeding said additional slag back into said first decanting vessel to react with the partly refined metal and the first-mentioned slag therein.

2. A process as defined in claim 1, wherein the steps of treating the metal in said first refining vessel and of treating the partly refined metal in said second refining vessel comprises blowing refining agents into the metal, respectively the partly refined metal, to form a metal-slag foam therefrom.

3. A process as defined in claim 2, wherein said refining agents comprise an oxidizing gas under pressure and a slag-forming material.

4. A process as defined in claim 2, wherein said partly refined metal is fed into said second refining vessel through an inlet opening located at a first level while the foam formed in said second refining vessel rises to second level higher than said first level and is fed by gravity into the inlet opening of said second decanting vessel located at a level lower than said second level, wherein said further slag is fed by gravity from said second decanting vessel into said first decanting vessel, and wherein the partly refined metal is fed by gravity from said first decanting vessel into said inlet opening of said second refining vessel.

* * * * *